Patented Jan. 12, 1932

1,841,076

UNITED STATES PATENT OFFICE

WILLIAM F. ZIMMERLI, OF PORTAGE TOWNSHIP, SUMMIT COUNTY, AND WALDO L. SEMON, OF CUYAHOGA FALLS, OHIO, ASSIGNORS TO THE B. F. GOODRICH COMPANY, OF NEW YORK, N. Y., A CORPORATION OF NEW YORK

METHOD OF MANUFACTURING RUBBER ARTICLES

No Drawing.   Application filed October 4, 1928.   Serial No. 310,434.

This invention relates to the art of manufacturing rubber articles and has as its object the provision of a method whereby shaped rubber articles may conveniently be prepared, or whereby articles may be coated with a layer of rubber.

Heretofore attempts have been made to deposit a layer of rubber on the surface of an article to be coated, or upon the surface of a form, by spraying a dispersion of rubber thereon, and evaporating the liquid dispersion medium. Such attempts have met with only a limited success, for the evaporation is so slow that when the article or form is not heated (and heating is often impossible), the liquid rubber dispersion tends to run off the surface upon which it is deposited, and the coating must be built up of successive thin layers, each of which must be at least partially dried before the subsequent layer is applied.

In the present invention such inconveniences have been overcome by exposing the freshly deposited rubber dispersion to a coagulating vapor. Consequently the rubber dispersion is coagulated during deposition upon the receiving surface, with the result that the deposit consists of a firm, self-supporting layer of coagulated rubber.

This invention is susceptible of numerous variations, all of which possess the common feature that a film of coagulable dispersion is coagulated during deposition or shortly thereafter, by exposure to a coagulating vapor. For example, the article to be coated may be dipped in latex and then exposed to the vapors of formic or acetic acid until the latex layer is substantially coagulated. Or the layer of latex may be applied in the form of a spray, and similarly coagulated by acid vapors before a second layer is sprayed on. In its preferred form, however, the invention is carried out by spraying latex through coagulant vapors in such a manner that the rubber is coagulated substantially as deposited. This may be accomplished by spraying the latex in an atmosphere in which the proper concentration of coagulant vapors is maintained, or by injecting the coagulant vapors into the latex spray, as by means of a second nozzle adjacent to the latex spray nozzle. Such simultaneous spraying and coagulation has the particular advantage that the deposit obtained is substantially free from stratification.

The rubber dispersion may be any coagulable dispersion, but is preferably an aqueous dispersion of rubber, such as natural latex, mixed with the necessary vulcanizing and other compounding ingredients. It is preferred to concentrate the latex, with the addition of the necessary alkali or other stabilizing ingredient, before spraying, since the time required for drying the formed article is thereby greatly reduced. The pigments, sulphur, accelerators, or other materials which it is desired to incorporate in the rubber may be previously dispersed in water, or may simply be moistened and stirred into the latex in a finely divided state. The compounded latex, that is, latex containing all the necessary compounding ingredients such as sulphur and accelerators, is then preferably brought to such a concentration that its consistency is that of a thin syrup, when it is ready for the spraying operation.

The coagulant vapor employed may be the vapor of any volatile coagulant, or even a mist or smoke of a liquid or solid which will cause a coagulation of the dispersion without any substantial injury to the rubber, but is preferably a mist made by spraying a solution of one of the lower fatty acids, such as formic or acetic acid. The ordinary mineral acids, such as hydrochloric or sulphuric acids, may be employed if desired, but are more strongly corrosive than the above-mentioned fatty acids. Coagulating salts, such as alum, may also be employed, either by direct dispersion in air or other neutral gas or by spraying a solution of a convenient concentration; or if the use of an acid coagulant is objectionable, neutral coagulants such as alcohol or acetone may be used. Acetic acid in approximately 50% solution in water has been found very satisfactory when combined with a latex spray. The acid spray is mixed with the spray of rubber dispersion in such proportions as to coagulate the rubber shortly after it has reached the surface on which it is to be deposited. Thus the dispersion is allowed to flow sufficiently to fill all cavities and render the surface smooth and uniform. If the coagulation is too rapid, and the deposit assumes a granular, spongy appearance, the concentration of coagulant in the spray is reduced somewhat, whereas if the coagulation is so long delayed that the deposited material tends to run or flow excessively, the concentration of coagulant is increased. The combined rubber and coagulant spray is directed over the article or form to be coated, in such a manner as to produce a coating of the desired thickness upon the several parts thereof.

The deposit of coagulated rubber produced by the process of this invention is dried in any convenient manner and may then be treated in any manner known to the art. For example, either soft or hard rubber may be produced by the vulcanization of such dried deposits containing the proper proportions of sulphur. If the rubber is deposited upon a mandrel or form, the coating may be stripped therefrom either before or after vulcanization, as may be found most convenient. If the rubber is to serve as a permanent coating, it is preferably applied over a thin layer of rubber cement or other adhesive composition, such as is commonly employed in vulcanizing rubber or wood, metal, or other surfaces.

For example, if it is desired to make an inner tube for automobile tires, a smooth mandrel of the proper diameter is rotated slowly while a combined spray of 50% acetic acid, and of latex containing sulfur, accelerator, zinc oxide, etc. in the proportions necessary to give the rubber the desired characteristics during and after vulcanization, is directed, either manually or by means of an automatic machine, over the length of the mandrel until a deposit of the proper thickness is produced. A strip of cloth is then wound spirally over the wet coagulated rubber in order to express, in large part, the water contained therein. The deposit is then dried in a heated chamber or in a vacuum, vulcanized in any convenient manner, say in open steam, stripped from the mandrel and the valve stem inserted and the ends spliced in the usual manner.

If it is desired to apply a permanent rubber coating to any article, the procedure is very similar. For example, if it is desired to line an acid container with a uniform layer of rubber, the container is cleaned, and coated with rubber cement or other adhesive composition. The combined spray of coagulant and properly compounded latex is then applied over the entire surface which is to be covered, until the required thickness has been built up. The rubber is then dried, and vulcanized in any usual manner.

It is to be understood that these examples are merely illustrative and that objects or forms of almost any character or shape may be coated with rubber by the process of this invention, that the composition of the rubber may be varied as desired, that the deposit may be of any convenient thickness, or may vary in thickness from one portion of the coating to another, or that numerous other changes may be made in the process described without departing from the spirit and scope of this invention. The invention is therefore not limited in any way except as may be required by the prior art and as indicated in the appended claims.

It is to be understood that the term "rubber" is employed in the appended claims in a generic sense to include caoutchouc, both natural and synthetic, reclaimed rubber, balata, gutta percha, rubber isomers and like products, whether or not admixed with pigments, fillers, or vulcanizing agents. The term "dispersion" is likewise employed in a generic sense to include emulsions or suspensions of substantially insoluble materials, the particles being of such fineness that they settle to the bottom or rise to the surface only very slowly. The term "coagulant vapor" is likewise employed in a generic sense to include coagulant gases, and mists, smokes or similar dispersions of liquid or solid coagulants in fine particles in a gaseous medium.

We claim:

1. The process of applying a coating of rubber to the surface of an article, which comprises spraying a coagulable dispersion of rubber thereon, and subjecting the droplets of the dispersion to the action of a coagulant vapor during the spraying operation, the concentration of coagulant being so adjusted that the rubber dispersion is coagulated on the said surface as a smooth, dense layer, substantially without flow.

2. The process of applying a coating of rubber to the surface of an article, which comprises spraying thereon a coagulable dispersion of rubber and subjecting the droplets of the dispersion during the spraying operation to the action of an acid coagulant vapor, the concentration of coagulant being so adjusted that the rubber dispersion is coagulated on the said surface as a smooth, dense layer, substantially without flow.

3. The process of applying a coating of rubber to the surface of an article, which comprises spraying thereon simultaneously a coagulable rubber dispersion and a coagulant therefor, the concentration of coagulant being so adjusted that the rubber dispersion is coagulated on the said surface as a smooth, dense layer, substantially without flow.

4. The process of applying a coating of rubber to the surface of an article, which comprises spraying thereon simultaneously a dispersion comprising latex, and a coagulant therefor, the concentration of coagulant being so adjusted that the rubber dispersion is coagulated on the said surface as a smooth, dense layer, substantially without flow.

5. The process of applying a coating of rubber to the surface of an article, which comprises spraying thereon simultaneously a compounded rubber latex, and a coagulant therefor, the concentration of coagulant being so adjusted that the rubber dispersion is coagulated on the said surface as a smooth, dense layer, substantially without flow.

6. The process of applying a coating of rubber to the surface of an article, which comprises spraying thereon simultaneously a compounded rubber latex, and a coagulant therefor, the concentration of coagulant being so adjusted that the rubber dispersion is coagulated on the said surface as a smooth, dense layer, substantially without flow, and drying the coating.

7. The process of applying a coating of rubber to the surface of an article, which comprises spraying thereon simultaneously a compounded rubber latex, and a coagulant therefor, the concentration of coagulant being so adjusted that the rubber dispersion is coagulated on the said surface as a smooth, dense layer, substantially without flow, and drying and vulcanizing the coating.

8. The process of applying a coating of rubber to an article, which comprises spraying thereon simultaneously a compounded rubber latex, and a coagulant comprising a water-soluble organic acid, the concentration of coagulant being so adjusted that the rubber dispersion is coagulated on the said surface as a smooth, dense layer, substantially without flow, and drying and vulcanizing the coating.

9. The process of applying a coating of rubber to an article, which comprises spraying thereon simultaneously a compounded rubber latex and an acetic acid solution, the concentration of coagulant being so adjusted that the rubber dispersion is coagulated on the said surface as a smooth, dense layer, substantially without flow, and drying and vulcanizing the coating.

10. The process of applying a permanent rubber coating to an article, which comprises coating the article with an adhesive composition, spraying thereon simultaneously a compounded rubber latex and a coagulant therefor, the concentration of coagulant being so adjusted that the rubber dispersion is coagulated on the said surface as a smooth, dense layer, substantially without flow, and drying the coating.

11. The process of applying a permanent rubber coating to an article, which comprises coating the article with an adhesive composition, spraying thereon simultaneously a compounded rubber latex and an acetic acid solution, the concentration of coagulant being so adjusted that the rubber dispersion is coagulated on the said surface as a smooth, dense layer, substantially without flow, and drying and vulcanizing the coating.

In witness whereof we have hereunto set our hands this 28th day of September, 1928.

WILLIAM F. ZIMMERLI.
WALDO L. SEMON.